US011928991B2

(12) United States Patent
Hunt

(10) Patent No.: US 11,928,991 B2
(45) Date of Patent: Mar. 12, 2024

(54) VIEWING DEVICE AND METHOD FOR PROVIDING VIRTUAL CONTENT OVERLAPPING VISUAL OBJECTS

(71) Applicant: Telefonaktiebolaget LM Ericsson (publ), Stockholm (SE)

(72) Inventor: Alexander Hunt, Tygelsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/128,090

(22) Filed: Mar. 29, 2023

(65) Prior Publication Data

US 2023/0230513 A1 Jul. 20, 2023

Related U.S. Application Data

(63) Continuation of application No. 17/283,647, filed as application No. PCT/EP2018/077350 on Oct. 8, 2018, now Pat. No. 11,663,938.

(51) Int. Cl.
*G09G 3/00* (2006.01)
*G09G 3/36* (2006.01)

(52) U.S. Cl.
CPC ............... *G09G 3/001* (2013.01); *G09G 3/36* (2013.01); *G09G 2320/0666* (2013.01)

(58) Field of Classification Search
None
See application file for complete search history.

(56) References Cited

U.S. PATENT DOCUMENTS 5,974,866 A 11/1999 Tjahjadi et al.
7,639,208 B1 * 12/2009 Ha .................... G02B 27/0172 345/9

(Continued)

FOREIGN PATENT DOCUMENTS

EP 3113158 A1 1/2017
WO 2017070215 A1 4/2017

OTHER PUBLICATIONS

Hincapié-Ramos, Juan David, et al. "SmartColor: real-time color and contrast correction for optical see-through head-mounted displays." IEEE Transactions on Visualization and Computer Graphics 21.12 (2015): 1336-1348.*

(Continued)

*Primary Examiner* — Ryan M Gray
(74) *Attorney, Agent, or Firm* — Withrow & Terranova, PLLC

(57) ABSTRACT

A viewing device comprising a controller, a transparent display and a visual shutter. The controller is configured to determine a color of virtual content to be displayed; determine a background color contrasting the virtual content displayed; determine a display area corresponding to where the virtual content is to be displayed; cause the visual shutter to enable a background to the virtual content to be displayed, the background having the contrasting background color thereby providing a contrasting background to the displayed virtual content (DVC); and to cause the transparent display to display virtual content for overlapping at least one visual object (VO) perceivable through the transparent display at least partially onto the background. The visual shutter is configured to enable the background by operating in a mode wherein at least a portion of the visual shutter is blocked to obstruct the VO in the blocked portion of the visual shutter.

12 Claims, 3 Drawing Sheets

(56) References Cited

U.S. PATENT DOCUMENTS

| | | | | |
|---|---|---|---|---|
| 9,964,827 | B1 | 5/2018 | Lee et al. | |
| 10,339,718 | B1 | 7/2019 | Kamal et al. | |
| 11,347,053 | B2 | 5/2022 | Fattal | |
| 11,663,938 | B2 * | 5/2023 | Hunt | G09G 3/2003 345/593 |
| 2012/0068913 | A1 | 3/2012 | Bar-Zeev et al. | |
| 2012/0092328 | A1 | 4/2012 | Flaks et al. | |
| 2013/0314453 | A1 | 11/2013 | Ko | |
| 2016/0240125 | A1 * | 8/2016 | Sridharan | G09G 5/026 |
| 2016/0320620 | A1 | 11/2016 | Maimone | |
| 2017/0336641 | A1 | 11/2017 | von und zu Liechtenstein | |
| 2018/0293947 | A1 | 10/2018 | Kurokawa et al. | |
| 2019/0096135 | A1 | 3/2019 | Dal Mutto et al. | |
| 2019/0171045 | A1 | 6/2019 | Masuda | |
| 2019/0180499 | A1 | 6/2019 | Caulfield et al. | |
| 2021/0350730 | A1 | 11/2021 | Hunt | |
| 2023/0230513 | A1 * | 7/2023 | Hunt | G09G 3/001 345/593 |
| 2023/0352466 | A1 * | 11/2023 | Breakspear | H01L 33/0095 |

OTHER PUBLICATIONS

Itoh, Yuta, et al. "Light attenuation display: Subtractive see-through near-eye display via spatial color filtering." IEEE transactions on visualization and computer graphics 25.5 (2019): 1951-1960.*

Cakmakci, Ozan, Yonggang Ha, and Jannick P. Rolland. "A compact optical see-through head-worn display with occlusion support." Third IEEE and ACM International Symposium on Mixed and Augmented Reality. IEEE, 2004.*

Maimone, Andrew, and Henry Fuchs. "Computational augmented reality eyeglasses." 2013 IEEE International Symposium on Mixed and Augmented Reality (ISMAR). IEEE, 2013.*

Hincapie-Ramos, Juan David, et al. "SmartColor: Real-time color correction and contrast for optical see-through head-mounted displays." 2014 IEEE International Symposium on Mixed and Augmented Reality (ISMAR). IEEE, 2014.*

Dao, et al., "Early Steps Towards Understanding Text Legibility in Handheld Augmented Reality," IEEE Virtual Reality 2013, Mar. 16-20, 2013, Orlando, Florida, pp. 159-160.

Grasset, et al., "Image-Driven View Management for Augmented Reality Browsers," IEEE International Symposium on Mixed and Augmented Reality 2012, Science and Technology Proceedings, Nov. 5-8, 2012, Atlanta, Georgia, pp. 177-186.

Kiyokawa, et al., "Occlusive Optical See-through Displays in a Collaborative Setup," International Conference on Computer Graphics and Interactive Techniques, Jul. 2002, ACM, 1 page.

Maimone, et al., "Computational Augmented Reality Eyeglasses," International Symposium on Mixed and Augmented Reality, Oct. 1-4, 2013, Adelaide, Australia, IEEE, 10 pages.

Mori, et al., "BrightView: Increasing Perceived Brightness of Optical See-Through Head-Mounted Displays Through Unnoticeable Incident Light Reduction," Conference on Virtual Reality and 3D User Interfaces, Mar. 18-22, 2018, Reutlingen, Germany, IEEE, pp. 251-258.

Sridharan, et al. "Color Correction for Optical See-Through Displays Using Display Color Profiles," Proceedings of the 19th ACM Symposium on Virtual Reality Software and Technology, Oct. 6-9, 2013, Singapore, pp. 231-240.

Examination Report for European Patent Application No. 18786261.0, dated Mar. 28, 2023, 22 pages.

International Search Report and Written Opinion for International Patent Application No. PCT/EP2018/077350, dated May 17, 2019, 14 pages.

Non-Final Office Action for U.S. Appl. No. 17/283,647, dated Aug. 18, 2022, 12 pages.

Notice of Allowance for U.S. Appl. No. 17/283,647, dated Dec. 12, 2022, 7 pages.

* cited by examiner

VIEWING DEVICE AND METHOD FOR PROVIDING VIRTUAL CONTENT OVERLAPPING VISUAL OBJECTS

This application is a continuation of U.S. patent application Ser. No. 17/283,647, filed Apr. 8, 2021, which is a 35 U.S.C. § 371 national phase filing of International Application No. PCT/EP2018/077350, filed Oct. 8, 2018, the disclosures of which are incorporated herein by reference in their entireties.

TECHNICAL FIELD

The present invention relates to a viewing device and a method, and in particular to a viewing device and a method for providing virtual content overlapping visual objects that is easy to perceive.

BACKGROUND

Virtual Reality (VR) systems are growing in popularity. Similarly so-called mixed or augmented reality systems are also growing in popularity. An augmented reality system will, herein, be defined as a system where virtual content is displayed as overlapping (physical) real-life visual objects. There will thus not be made any difference between augmented reality, mixed reality or enhanced reality for the context of this application and the problems and their solutions discussed herein applies to all Optical See-Through (OST) devices.

As the virtual content of augmented reality (AR) systems is displayed as overlapping visual content, there may be circumstances where the virtual content is difficult to see or perceive. FIG. 1 shows an example of such a situation. In FIG. 1, there are two areas where virtual content (DVC) is to be displayed. As can be seen in FIG. 1, it is difficult to clearly see the virtual content when it overlaps some visual objects. In FIG. 1, as well as in FIGS. 4 and 5, white (or light colored) text is illustrated as outlined text in order to avoid having to use greyscale objects in the drawings.

Proposed prior art solutions have been focused on analyzing the background and blocking out disturbing objects in the background to render the virtual content easy to perceive.

However, such solutions require a lot of processing power, and usually also costly peripherals to be used. Furthermore, as the background changes, the manipulation of the background must also change which is distracting to a user.

There is thus a need for a viewing device and a method for providing virtual content that is easy to perceive.

SUMMARY

An object of the present teachings is to overcome or at least reduce or mitigate the problems discussed in the background section.

According to one aspect a viewing device is provided, the viewing device comprising a controller, a transparent display and a visual shutter, wherein the controller is configured to: determine a color of virtual content to be displayed; determine a background color contrasting the virtual content displayed; determine a display area corresponding to where the virtual content is to be displayed; cause the visual shutter to enable a background to the virtual content to be displayed, the background having the contrasting background color thereby providing a contrasting background to the displayed virtual content; and to cause the transparent display to display virtual content for overlapping at least one visual object perceivable through the transparent display at least partially onto the background, wherein the visual shutter is configured to enable the background by operating in a mode wherein at least a portion of the visual shutter is blocked so as to obstruct the visual object in the blocked portion of the visual shutter.

This has the benefit that by selecting the color of the virtual content and the color of the background enabled by the visual shutter, the visual shutter blocking out the background view of visual objects, as opposed to selecting what portions of the background provided by the visual objects seen through the viewing device that should be blocked, a contrast for the virtual content can be achieved without substantive processing, and without having the blocked-out portions change according to changes in the background view, giving a more stable view to observe for the user. The color of the virtual content, the area where the virtual content is to be displayed, and the color possible to achieve by the blocked-out portion are all very easy to determine for the controller, and thus requires a minimum of processing utilizing an ingeniously simple manner of providing a contrast for the virtual content.

In one embodiment the color of the virtual content to be displayed is determined by the controller being further configured to select it based on a blocked color of the visual shutter.

This has the benefit that the virtual content is ensured to be perceived by selecting a color to display it in, which color contrasts the background of the blocked-out section, thereby providing an improved readability (as in perceivability) of the virtual content without substantive processing in a ingeniously simple manner.

In one embodiment the color of the background is determined by the controller being further configured to select it based on the color of the virtual content to be displayed.

This has the benefit that the virtual content is ensured to be perceived by selecting a color for the background to display the virtual content on, i.e. the blocked-out section, which color contrasts the virtual content, thereby providing an improved readability (as in perceivability) of the virtual content without substantive processing in a ingeniously simple manner.

In one embodiment the controller is further configured to provide said contrasting color of said background by causing the transparent display to display the background overlapping the blocked portion of the visual shutter along with the displayed virtual content.

This has the benefit that the selection of background color is not limited to the color of the visual shutter.

In one embodiment the visual shutter comprises a PN-LC display comprising at least one PN-LC cell, wherein the visual shutter is configured to provide a blocked-out portion perceivable as white onto which the virtual content is to be displayed. This provides a blocked-out portion of a white color, thereby facilitating other colors to be used easily as background colors.

In one embodiment the visual shutter comprises a color liquid crystal display, wherein the visual shutter is configured to provide a blocked-out portion perceivable as a selected color onto which the virtual content is to be displayed. This can provide a filtering effect and/or for providing a background of a selected color.

In one embodiment the visual shutter comprises a color filter, wherein the visual shutter is configured to provide a blocked-out portion perceivable as a color of the color filter onto which the virtual content is to be displayed.

In one embodiment the transparent display is a self-illuminating transparent display configured to display visual content through the use of an internal light source.

This enables for use of visual shutters that has a color perceivable as dark, which greatly absorbs the incoming illumination, while still providing backgrounds of other colors and for being able to see the virtual content being displayed.

In one embodiment the visual shutter is a Liquid Crystal Display, wherein the visual shutter is configured to provide a blocked-out portion perceivable as black onto which the virtual content is to be displayed.

In one embodiment the visual shutter comprises at least one PN-LC cell and at least one LCD, wherein the visual shutter is configured to provide a blocked-out portion perceivable as partially white, partially black and/or in a gray scale onto which the virtual content is to be displayed.

In one embodiment the transparent display comprises a projector device and a partially transparent mirror, wherein the projector device is arranged to project the content to be displayed onto the partially transparent mirror and the partially transparent mirror is arranged to reflect the displayed virtual content and to enable visual objects to be perceivable through the partially transparent mirror, the displayed virtual content thereby being perceived as overlapping the visual objects.

In one embodiment the transparent display comprises a plurality of wave guides.

According to one aspect a method for use in a viewing device is provided, the method comprises determining a color of virtual content to be displayed; determining a background color contrasting the virtual content displayed; determining a display area corresponding to where the virtual content is to be displayed; causing the visual shutter to enable a background to the virtual content to be displayed, the background having the contrasting background color thereby providing a contrasting background to the displayed virtual content; and causing the transparent display to display virtual content for overlapping at least one visual object perceivable through the transparent display at least partially onto the background, wherein the method comprises enabling the background by operating the visual shutter in a mode wherein at least a portion of the visual shutter is blocked so as to obstruct the visual object in the blocked portion of the visual shutter.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 2:
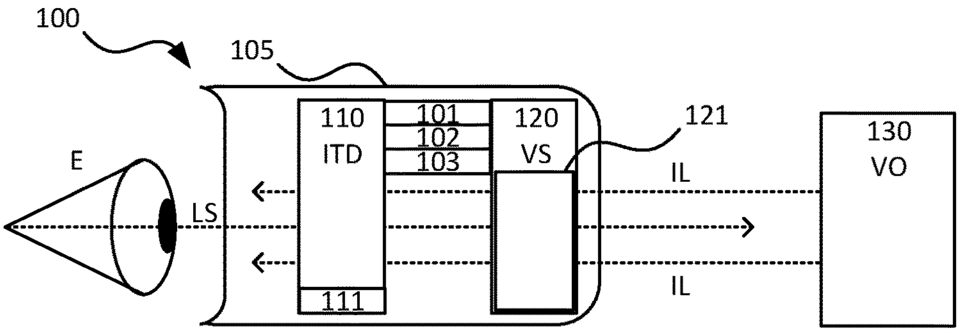
FIG. 2 shows a schematic view of a viewing device according to an embodiment of the present invention.

FIG. 2 shows a schematic view of a viewing device 100 according to an embodiment of the present invention. The viewing device 100 is a see-through device, where a user looks in through one end, and sees the visual objects present at the other end or in the line of sight at the other end of the viewing device 100. In one embodiment the viewing device 100 is a head mounted viewing device 100 to be worn by a user (not shown explicitly but represented by the eye E in FIG. 2) for looking through the viewing device 100. In one such embodiment the viewing device 100 is arranged as glasses to be worn by a user. The viewing device 100 comprises a housing 105 and transparent display arrangement 110. The transparent display arrangement 110 is configured to be self-illuminating and will be referred to herein as an ITD (Illuminated Transparent Display). An ITD 110, being self-illuminating, is capable of displaying content using an internal light source 111, thereby not relying on other light sources to render the displayed content perceivable. The ITD 110 is arranged in the housing 105 so that a visual object VO may be perceived along the line of sight, indicated LS in the figure, or field of view of an eye E looking through the viewing device 100.

A visual shutter 120 VS is also arranged in the housing 105 of the viewing device 100. The visual shutter 120 is arranged after the ITD 110 in the direction of the line of sight, LS, so that as a real life visual object VO is viewed, any illumination emanating (emitted or reflected) from the visual object VO first travels through the visual shutter 120 and then the ITD 110 before being perceived by the eye E.

The ITD 110 is configured to display virtual content DVC to be viewed by the user. As the ITD is transparent and as the ITD 110 is located before the visual shutter 120 in the line of sight, the displayed virtual content DVC will be perceived by a user as overlapping any visual objects VO viewed through the viewing device 100. The viewing device 100 is thus suitable for use with augmented reality, mixed reality and extended reality systems. For the purpose of this application, augmented reality AR will be considered to be the equivalent and interchangeable with the terminologies of mixed reality and extended reality. Further references will simply be to Augmented Reality (AR), but applies equally to mixed or extended reality.

The viewing device 100 further comprises a memory 102 and a controller 101. The controller is configured to control the ITD to display the virtual content.

The memory 102 is configured to store graphics data and computer-readable instructions that when loaded into the controller indicates how the viewing device 100 is to be controlled. The controller 101 is configured to control the overall operation of the viewing device 100, including the ITD 110 and the visual shutter 120. In one embodiment, the controller 101 is a graphics controller. In one embodiment, the controller 101 is a general purpose controller. In one embodiment, the controller 101 is a combination of a graphics controller and a general purpose controller. In one embodiment, the controller 101 is configured to receive the virtual content to be displayed. In one embodiment, the controller 101 is configured to generate the virtual content to be displayed. In one embodiment, the controller 101 is configured to receive the virtual content to be displayed. In one embodiment, the controller 101 is configured to receive parts of the virtual content to be displayed and to generate parts of the virtual content to be displayed.

In one embodiment the viewing device 100 further comprises a communication interface 103. The communication interface may be wired and/or wireless. The communication interface may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface.

In one embodiment the communication interface comprises a radio frequency (RF) communications interface. In one such embodiment the communication interface comprises a Bluetooth™ interface, a WiFi™ interface, a ZigBee™ interface, a RFID™ (Radio frequency IDeintifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobilé) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol. The communications interface 103 is configured to enable the viewing device 100 to receive and/or transmit data and/or instructions regarding the virtual content to be displayed. The communications interface 103 may also be configured to enable the viewing device 100 to communicate with other devices, such as other viewing devices 100, smartphones (not shown), internet tablets, computer tablets or other computers, media devices, such as television sets, gaming consoles, video viewer or projectors.

Figure 3:
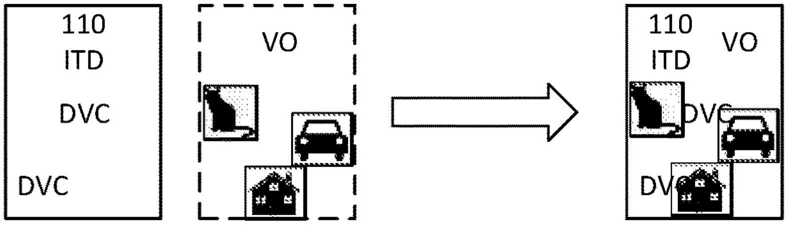
FIG. 3 shows a schematic view of an exemplary view seen through a viewing device according to FIG. 2 according to one embodiment of the teachings herein.

FIG. 3 shows a schematic view of an exemplary view seen through the viewing device 100. On the left of the figure, there is shown the ITD 110 and the displayed virtual content DVC being displayed on the ITD 110 and also the current field of view (dashed rectangle) with the visual objects VO currently viewable. In this example view, the visual objects (VO) are exemplified as a box showing a cat, a box showing a car, and a box showing a house. On the right of the figure, the composite of the two is shown, i.e. the view actually seen through the viewing device 100. As can be seen, the displayed virtual content DVC is perceived as overlapping the real life visual objects VO thereby providing an augmented reality. As can also be seen, when there is little contrast between the visual objects and the virtual content to be displayed, it may be difficult to discern the displayed virtual content.

The visual shutter 120 VS is configured to operate in different modes. A first mode is an open mode where light is permitted to travel through the visual shutter 120. A second mode is a blocking mode where light is blocked and not permitted to travel through the visual shutter 120.

The modes may also be combined so as for example, the visual shutter 120 may be operating to permit light unaffected in one or more portions of the visual shutter 120 and block light entirely in one or more portions.

In one embodiment the visual shutter 120 comprises a Liquid Crystal display, commonly referred to as a LCD. Even though the figures only show one LCD 121, the visual shutter 120 may comprise a plurality of displays 121. Examples of LCD technologies s are Twisted Neumatic, Different Vertical Alignment (VA), Different In Plane Switching (IPS), different Fringe Field Switching (FFS) or Advanced Fringe Field Switching (AFFS).

As is commonly known to a skilled person, an LCD 121 has a resolution determined by the number of and arrangement of cells.

In one embodiment, the LCD 121 has a single cell corresponding to a main portion of the display surface. In one embodiment, the LCD 121 has two cells, each cell corresponding to half (upper/lower, or right/left) of a main portion of the display surface.

In one embodiment, the LCD 121 has a plurality of cells, each cell corresponding to a section of a main portion of the display surface.

In one embodiment the LCD 121 has a resolution corresponding to the resolution of the ITD 110.

In one embodiment the LCD 121 has a resolution corresponding to the ratio of the ITD 110. In one embodiment the LCD 121 has a resolution corresponding to a multiple of the ratio of the ITD 110. In such embodiments, if the ITD 110 has a ratio of for example 16:9, the LCD 121 will have cells arranged in 16 columns and 9 rows, or a multiple thereof up to and including the resolution of the ITD 110. In embodiments where the cell arrangement is based on the ratio or resolution of the ITD 110, the cells may have a uniform shape.

The cells may be activated by the controller 101 or by a controller of the visual shutter (which is assumed to be part of the controller 101 for the purpose of this application), in group or one-by-one, to provide a blocked-out section 125. In the simplest arrangement, each cell of the LCD 121 corresponds to one blocked-out section 125.

In one embodiment, the LCD 121 is arranged to provide segments of a dark or black color. The visual shutter 120 is thus configured to provide a blocked-out portion 125 perceivable as black onto which the virtual content is to be displayed. Examples of such LCDs 121 are TN, VA, IPS or AFFS LCDs.

In one embodiment, the visual shutter 120 comprises a Polymer Network Liquid Crystal PNLC layer, herein referred to as a PNLC Display 121. In such an embodiment the LCD 121 may be arranged to provide one or several, depending on the cell arrangement, blocked-out sections 125 of a light or (milky) white color. The visual shutter 120 is thus configured to provide a blocked-out portion 125 perceivable as white onto which the virtual content is to be displayed.

In one embodiment the visual shutter 120 comprises a color LCD 121. The color LCD 121 may be utilized to provide a color filtering of the visual content perceived through the viewing device 100.

In an embodiment where the visual shutter comprises a PNLCD 121 and a color LCD 121, the visual shutter may be arranged to provide a blocked-out portion 125 of any color selected (within the capabilities of the color LCD 121). The visual shutter 120 is thus configured to provide a blocked-out portion 125 perceivable as any selected color onto which the virtual content is to be displayed.

In one embodiment, the visual shutter comprises a color filter having a color, whereby the visual shutter is configured to provide a blocked-out portion in the color of the filter.

Figure 4:
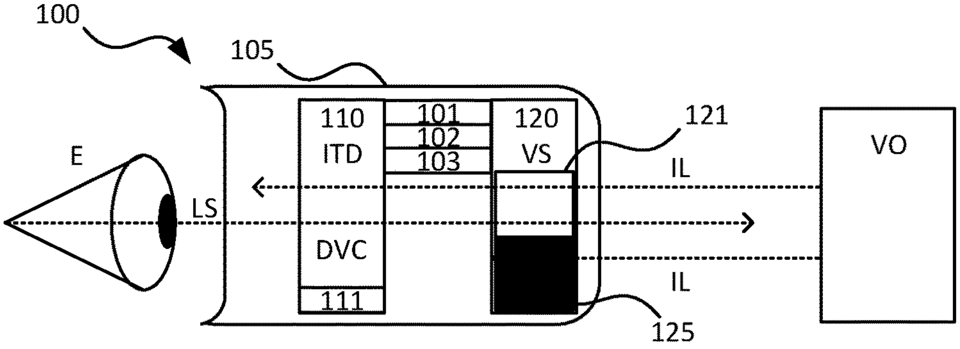
FIG. 4 shows a schematic view of a viewing device according to an embodiment of the present invention.

FIG. 4 shows a schematic view of a viewing device 100 according to an embodiment of the present invention. In FIG. 4, the visual shutter 120 is operating to partially block light in a portion of the visual shutter 120. This may be done by operating the visual shutter in an open mode in some portions and in a blocked mode in other portions, i.e. the portion(s) to be blocked. In the example of FIG. 4, the visual shutter 120 is operating to block light in a lower part of the visual shutter 120, whilst permitting light to travel through in an upper part of the visual shutter 120. It should be noted that the visual shutter 120 may be configured to operate in different portions than the portions shown as examples in FIG. 4, and as a skilled person would understand, any portion would be possible to open, block or partially block (as in decreasing the intensity).

Figure 5:
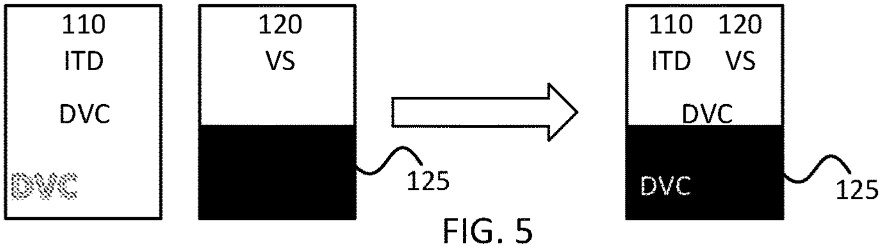
FIG. 5 shows a schematic view of an exemplary view seen through a viewing device according to FIG. 4 according to one embodiment of the teachings herein.

FIG. 5 shows a schematic view of an exemplary view seen through the viewing device 100. On the left of the figure, there is shown the ITD 110 and the displayed virtual content DVC being displayed on the ITD 110 along with the visual shutter 120 with a portion 125 being operated in a blocked mode, as indicated by that portion or section being shown as blacked out. As can be seen the displayed virtual content is in different colors making some of the displayed virtual content difficult to discern. On the right of the figure, the composite of the two is shown, i.e. the see-through view provided by the combination of the ITD 110 and the visual shutter 120. As can be seen, the displayed virtual content DVC is seen more clearly as the contrast to the background is dramatically changed through the operation of the visual shutter 120. All displayed virtual content can now be clearly seen by the viewer.

Figure 6:
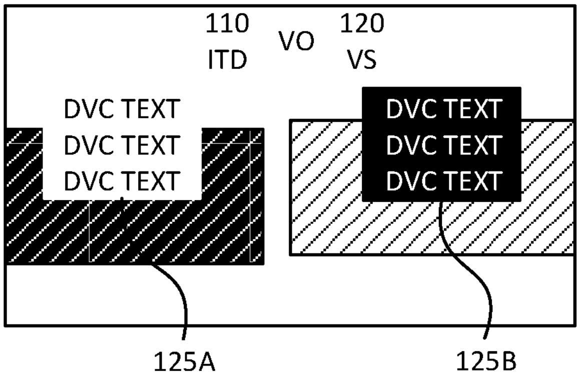
FIG. 6 shows an example of how the displayed virtual content of FIG. 1 may be rendered perceivable according to one embodiment of the teachings herein.
Figure 9:
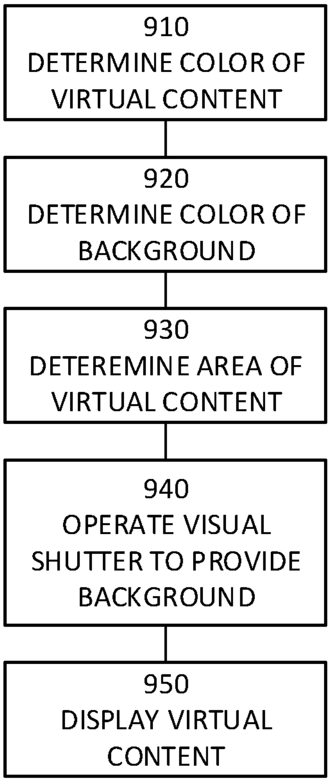
FIG. 9 shows a flowchart of a general method according to an embodiment of the teachings herein.

Returning to FIG. 1 showing the problem of how virtual content being displayed overlapping a visual background of low contrast or being cluttered, it will now be disclosed how a viewing device 100 according to the teachings herein is configured to at least partially overcome this problem with simultaneous reference to FIGS. 1, 6 and 9, FIG. 9 showing a schematic flowchart of a general method according to the teachings herein.

Figure 1:
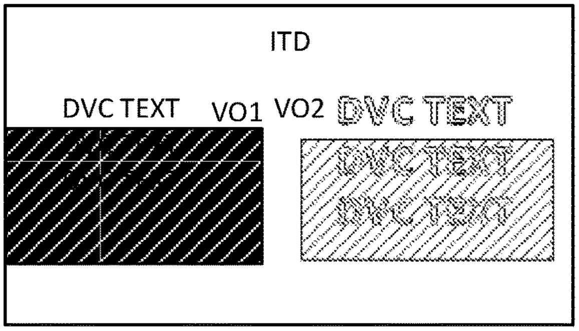
FIG. 1 shows a schematic view of the problem of how virtual content being displayed overlapping a visual background of low contrast or being cluttered.

As can be seen in FIG. 1, if virtual content of a certain color is to be displayed onto a background of the same or similar color, it may be difficult for a user to perceive the content. The same applies if the background is cluttered or busy. Likewise, backgrounds having moving objects may also be distracting and make it more difficult to perceive the virtual content to be displayed.

The inventors have realized through inventive thinking and reasoning that it is possible to display content that will always be easily perceivable while saving on processing power not having to analyze any backgrounds as regards color, cluttering, movable objects and so on, by instead focusing on the properties of the content to be displayed.

As the content to be displayed is already known to the controller 101 of the viewing device 100, as it is received or even generated by the viewing device 100, the analysis becomes easy and uncomplicated not requiring much processing power. In an embodiment where the content to be displayed is received by the viewing device, the results of the analysis may also be received along with the content, or data indicating the content.

One main aspect of virtual content to be displayed is the color. The viewing device 100 therefore determines what color(s) the virtual content is to be displayed in. The determination may be performed as retrieving color information from the virtual content, or by selecting what color the virtual content should be displayed in.

The selected color for the virtual content may be selected based on the type of visual shutter being used. In the case of a visual shutter 120 providing backgrounds that are perceived to be black, such as utilizing a TN LCD (or other LCD technology) based visual shutter, the selected color for the virtual content may be chosen to be a light color, such as white, yellow, light blue or light green, thereby contrasting the background and rendering the virtual content to be displayed easily perceivable. In the case of a visual shutter 120 providing backgrounds that are perceived to be black, such as a TN LCD based visual shutter, the selected color may be chosen to be a dark color, such as black, dark blue, dark green or red, thereby contrasting the background and rendering the virtual content to be displayed easily perceivable. In such embodiments the background color is implicitly determined by the shutter, or rather the perceived color of a blocked-out portion. It should be noted that even though all examples herein are focused on text of a uniform color, a skilled person would understand that the teachings herein also apply to other forms of virtual content and to a mixture of colors.

In an embodiment where the selected color is the color received for the virtual content to be displayed and where the visual shutter comprises a color LCD 121, the controller 121 may be configured to select the background color based on the virtual content color and adapt the color LCD 121 accordingly.

Examples of contrasting colors are red contrasting green, black contrasting white, blue contrasting yellow and orange contrasting purple. As would be understood, any colors not adjacent on a color wheel could be used as contrasting colors.

In embodiments where the ITD 110 is self-illuminating, there is an added benefit in that the ITD 110 is capable of providing a background even when the light originating from the visual objects is blocked, the blocked sections appearing to be black. If the ITD 110 is not self-illuminating any blocked portions would also not allow light to permeate whereby any content displayed in those blocked portions would not be illuminated and thus also not being perceivable to a user. In some embodiments, the ITD 110 is therefore configured to provide a background of a color different from that of the visual shutter. In such embodiments the ITD 110 provides the background color and it may be determined by the controller. As the visual shutter, blocks the light coming from behind (i.e from the visual objects in the viewing direction), the visual shutter 120 has enabled the background to be displayed in the determined color in the blocked portions.

FIG. 6 shows an example of how the displayed virtual content of FIG. 1 may be rendered perceivable according to the teachings herein. FIG. 6 shows a schematic view of what is perceived through a viewing device 100, i.e. the composite of the displayed virtual content DVC being displayed by the ITD 110, the blocked portions of the visual shutter 120 and the visual objects VO. As in FIG. 1, there is a dark-colored visual object VO1 on the left side of the figure and a light-colored visual object VO2 on the right side of the figure. The colors of the visual objects are schematically indicated by dashed lines of different lengths in the two visual objects.

The viewing device 100 determines which color(s) the virtual content is to be displayed in. For the displayed virtual content on the left side, the color is a dark color, in this example black. For the displayed virtual content on the right side, the color is a dark color, in this example white or light grey.

The viewing device 100 may also determine a display area which the virtual content will be displayed in. The viewing device 100 causes the visual shutter 120 to enter a blocked mode corresponding to the determined display area.

The viewing device 100 also determines a contrasting color for the background. The determination may be done by default to be a color contrasting the perceived color of the visual shutter when operated in a blocked mode. In one such embodiment where the visual shutter blocks light in a certain color, the viewing device 100 is configured to determine that the displayed virtual content is to be displayed in a contrasting color to that perceived for the visual shutter 120 when in a blocked mode. In the example of an TN LCD visual shutter, the perceived color would be black, so white may be chosen as the contrasting color for the background. In the example of a PN-LCD visual shutter, the perceived color would be white, so black may be chosen as the contrasting color for the background.

In embodiments where the visual shutter comprises a color LCD 121, the color LCD 121 may be utilized as a filter for providing a filtered light in the blocked-out section 125, only blocking out a portion of the light according to the color setting of the color LCD 121.

As mentioned above, the visual shutter 120 comprises a combination of arrays in some embodiments. In one such example, the visual shutter comprises one TN LCD (being an example of a LCD 121 providing a perceived black background) and one PN-LCD (being an example of a LCD 121 providing a perceived white background). This enables the perceived background color to be provided in a gray scale, depending on the settings of the TN LCD array and the PN-LCD array.

The viewing device 100 causes the visual shutter 120 to block the display areas, providing the background in the determined background color(s) while displaying the virtual content in the determined content color(s). The ITD 120 may additionally display a supplemental background, supplementing the background provided by the visual shutter 120. If the visual shutter 120 is only able to provide a blocked background in one color, the ITD 110 is thus able to adapt the background by displaying a specific background. As the ITD 110 is self-illuminating it is not dependent on the light permeating the visual shutter, and can thus display its own image on the blocked areas. Any color of the background may thus be displayed regardless what perceived color the visual shutter 120 provides. It should be noted that a visual shutter blocking light illuminating the visual objects may only be perceived to be black (as no or little light permeates the visual shutter), whereas its true color may in fact be another, such as white, which can be perceived if the visual shutter is illuminated, as may be done by an ITD projecting light.

Returning to FIG. 6, a white background has been determined for the virtual content to be displayed on the left side, and a black background has been determined for the virtual content to be displayed on the right side. As can be seen, the displayed virtual content DVC now clearly contrasts the background and are easily perceivable over the visual objects.

In one embodiment, the viewing device 100 is further configured to display also the background, the visual shutter's 120 blocked areas 125 then serving to clear up the background from disturbing clutter. In such embodiments, where the ITD 110 is self-illuminating, the displayed background will be clearly visible to a user, regardless of the visual objects as they are being blocked.

It should be noted that the number of blocked areas may differ depending on the design of the viewing device 100 and the virtual content to be displayed and is not limited to the examples given herein. The shapes of the blocked areas may also change and vary depending on the design of the viewing device 100 the virtual content to be displayed.

Figure 7:
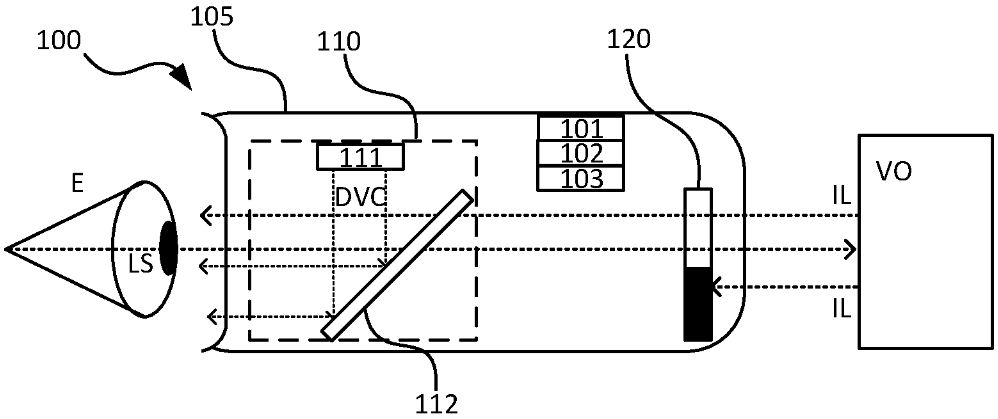
FIG. 7 shows a schematic view of a viewing device 100 according to one embodiment of the teachings herein.

FIG. 7 shows a schematic view of a viewing device 100 according to one embodiment of the teachings herein. The viewing device 100 comprises an ITD comprising a projector device 111, operating as the internal light source, and a partially transparent mirror 112. Examples of projector devices 111 are, but not restricted to, a DLP (Digital Light Processing) projector or an LED (Light Emitting Diode) or OLED (Organic Light Emitting Diode) micro display. The projector device 111 is arranged to project the content to be displayed onto the partially transparent mirror 112. The partially transparent mirror 112 is arranged to reflect the displayed virtual content DVC to a user and to enable visual objects VO to be perceivable through the partially transparent mirror. The user will thereby perceive the displayed virtual content DVC as overlapping the visual objects VO. A visual shutter 120 is arranged subsequent the partially transparent mirror 112 in the direction of the line of sight LS, in order to block visual objects to be perceivable through the viewing device.

Figure 8:
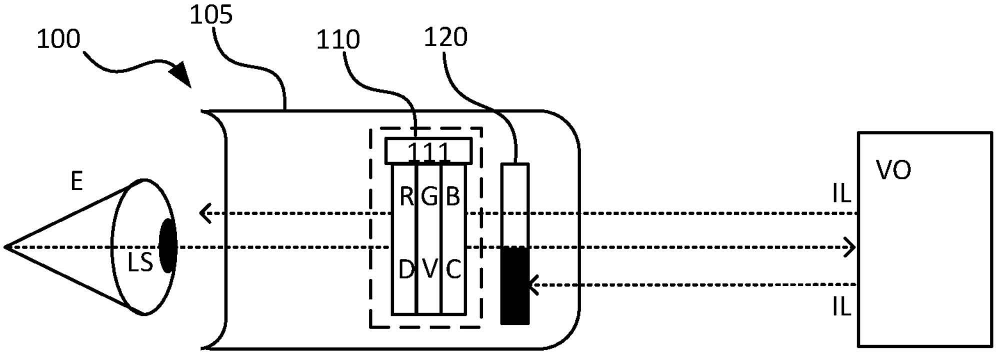
FIG. 8 shows a schematic view of a viewing device 100 according to one embodiment of the teachings herein.

FIG. 8 shows a schematic view of a viewing device 100 according to one embodiment of the teachings herein. The viewing device 100 comprises an ITD 110 comprising a wave guide display 111, operating as the internal light source. In an embodiment where the waveguide display 111 comprises a single waveguide the wave guide display 111 may be used to display the color of the waveguide. In an embodiment where the waveguide display 111 comprises a plurality of waveguides 111 the wave guide display may be used to display different colors. In the illustrated example the waveguide display 111 comprises three waveguides that are indicated by RGB (Red Green Blue, being a common color denomination for color displays in the field of displays) in the example of FIG. 6. The waveguide display 111 is configured to display the displayed virtual content DVC to a user and to enable visual objects VO to be perceivable through the partially transparent mirror. The user will thereby perceive the displayed virtual content DVC as overlapping the visual objects VO. A visual shutter 120 is arranged subsequent the wave guides in the direction of the line of sight LS, in order to block visual objects to be perceivable through the viewing device.

In one embodiment the ITD 110 comprises a plurality of waveguide displays 111 or rather a multiple of three waveguides. For the purpose of the teachings herein and for simplicity a waveguide display 111 is considered to comprise three waveguides. In such an embodiment, each waveguide display 111 may be utilized by the controller to provide one focal plane for the virtual content to be displayed. Utilizing more than one waveguide may then provide a three dimensional effect. The ITD 110 may be configured to shift the depth plane of the virtual content being displayed thereby providing the three dimensional effect.

FIG. 9 shows a flowchart of a general method according to an embodiment of the teachings herein. The method utilizes a viewing device 100 as taught herein for enhancing the readability of virtual content in the viewing device 100. The method comprises determining 910 a color of virtual content to be displayed, determining 920 a background color contrasting the virtual content displayed and determining 930 a display area corresponding to where the virtual content is to be displayed. Thereafter the visual shutter is operated 940 to enable a background to the virtual content to be displayed. The background has the contrasting background color, as explained above, and thereby provides a contrasting background to the displayed virtual content DVC. The transparent display 110 is also caused to display virtual content DVC for overlapping at least one visual object VO perceivable through the transparent display 110 at least partially onto the background. Wherein the method comprises enabling the background by operating the visual shutter 120 in a mode wherein at least a portion of the visual shutter 120 is blocked so as to obstruct the visual object VO in the blocked portion 125 of the visual shutter 120. The readability of the virtual content has thus been improved. Even though the examples herein have been focused on displaying text as virtual content, the teachings herein also apply to displaying other graphics (such as shapes, images and so on) as the virtual content.

The invention claimed is:

1. A viewing device comprising a controller, a transparent display and a visual shutter, wherein the controller is configured to:

determine a color of virtual content to be displayed;

determine a background color that contrasts with the color of the virtual content to be displayed;

determine a display area corresponding to where the virtual content is to be displayed;

block at least a portion of the visual shutter to obstruct a visual object (VO) perceivable through the transparent display;

display, using the transparent display, a background to the virtual content, the background having the background color and overlapping the blocked portion of the visual shutter; and display, using the transparent display, the virtual content overlapping the VO at least partially onto the background.

2. The viewing device according to claim 1, wherein the controller is configured to determine the color of the virtual content to be displayed by being configured to select the color based on a blocked color of the visual shutter.

3. The viewing device according to claim 1, wherein the controller is configured to determine the background color by being configured to select the background color based on the color of the virtual content to be displayed.

4. The viewing device according to claim 1, wherein:

the visual shutter comprises an PN-LC display comprising at least one PN-LC cell; and the visual shutter is configured to provide the blocked portion perceivable as white.

5. The viewing device according to claim 4, wherein:

the visual shutter comprises at least one PN-LC cell and at least one LCD; and the visual shutter is configured to provide a blocked-out portion perceivable as one or more of partially white, partially black, and gray scale.

6. The viewing device according to claim 1, wherein:

the visual shutter comprises a color liquid crystal display; and the visual shutter is configured to provide a blocked-out portion perceivable as a selected color.

7. The viewing device according to claim 6, wherein:

the transparent display comprises a projector device and a partially transparent mirror;

the projector device is arranged to project the virtual content to be displayed onto the partially transparent mirror; and the partially transparent mirror is arranged to reflect the displayed virtual content and to enable the VO to be perceivable through the partially transparent mirror, the displayed virtual content thereby being perceived as overlapping the VO.

8. The viewing device according to claim 6, wherein the transparent display comprises a plurality of wave guides.

9. The viewing device according to claim 1, wherein:

the visual shutter comprises a color filter; and the visual shutter is configured to provide a blocked-out portion perceivable as a color of the color filter.

10. The viewing device according to claim 1, wherein the transparent display is a self-illuminating transparent display configured to display visual content using an internal light source.

11. The viewing device according to claim 10, wherein:

the visual shutter is a liquid crystal display; and the visual shutter is configured to provide a blocked-out portion perceivable as black.

12. A method for enhancing the readability of virtual content in a viewing device comprising a controller, a transparent display and a visual shutter, the method comprising:

determining, by the controller, a color of virtual content to be displayed;

determining, by the controller, a background color that contrasts with the color of the virtual content to be displayed;

determining, by the controller, a display area corresponding to where the virtual content is to be displayed;

blocking, by the controller, at least a portion of the visual shutter to obstruct a visual object (VO) perceivable through the transparent display;

displaying, by the controller using the transparent display, a background to the virtual content, the background having the background color and overlapping the blocked portion of the visual shutter; and displaying, by the controller using the transparent display, the virtual content overlapping the VO at least partially onto the background.

* * * * *